(12) United States Patent
Rokowski et al.

(10) Patent No.: US 11,248,140 B2
(45) Date of Patent: Feb. 15, 2022

(54) HIGHLY WATER-RESISTANT, FLEXIBLE CEMENTITIOUS COATING

(71) Applicant: Beijing Oriental Yuhong Waterproof Technology Co. Ltd., Beijing (CN)

(72) Inventors: Joseph Martin Rokowski, Barto, PA (US); Guang Han, Beijing (CN); Willie Lau, Lower Gwynedd, PA (US); Zhenping He, Chalfont, PA (US); Xiaobin Liu, Beijing (CN); Wei Guo, Beijing (CN)

(73) Assignee: Beijing Oriental Yuhong Waterproof Technology Co. Ltd., Beijing (CN)

( * ) Notice: Subject to any disclaimer, the term of this patent is extended or adjusted under 35 U.S.C. 154(b) by 78 days.

(21) Appl. No.: 16/720,857

(22) Filed: Dec. 19, 2019

(65) Prior Publication Data
US 2020/0208002 A1    Jul. 2, 2020

Related U.S. Application Data

(60) Provisional application No. 62/786,064, filed on Dec. 28, 2018.

(51) Int. Cl.
| | | |
|---|---|---|
| *C09D 109/08* | (2006.01) | |
| *C09D 183/06* | (2006.01) | |
| *C09D 1/06* | (2006.01) | |
| *C08K 3/36* | (2006.01) | |
| *C08K 5/092* | (2006.01) | |
| *C08K 3/22* | (2006.01) | |
| *C08K 3/30* | (2006.01) | |
| *C08K 5/3492* | (2006.01) | |
| *C08K 5/42* | (2006.01) | |

(52) U.S. Cl.
CPC ............. *C09D 109/08* (2013.01); *C09D 1/06* (2013.01); *C09D 183/06* (2013.01); *C08K 3/36* (2013.01); *C08K 5/092* (2013.01); *C08K 5/34922* (2013.01); *C08K 5/42* (2013.01); *C08K 2003/2241* (2013.01); *C08K 2003/2296* (2013.01); *C08K 2003/3045* (2013.01)

(58) Field of Classification Search
CPC .......... C09D 109/08; C09D 1/06; C09D 1/08; C09D 183/06
See application file for complete search history.

(56) References Cited

U.S. PATENT DOCUMENTS

| | | | | |
|---|---|---|---|---|
| 2001/0007711 A1* | 7/2001 | Schwartz | ............ | C04B 41/5076 428/220 |
| 2007/0224362 A1* | 9/2007 | Briand | ................. | C09D 163/00 427/427.4 |
| 2015/0329422 A1* | 11/2015 | Grelaud | ................ | C04B 28/065 106/695 |

OTHER PUBLICATIONS

ASTM International, Standard Specification for Portland Cement, Designation: C150/C150M-20, 2020, 9 pages.
Blackley, Emulsion Polyimerisation Theory and Practice, Applied Science Publishers Ltd., 1975, 4 pages.
Blackley, "Emulsion Polyimerisation", Chapter 10, Monomers, 1975, pp. 418-435.

* cited by examiner

*Primary Examiner* — Wenwen Cai
(74) *Attorney, Agent, or Firm* — RatnerPrestia (57) ABSTRACT

Provided are highly water-resistant, flexible cementitious coating compositions comprising: an aqueous styrene-butadiene latex, one or more epoxy silane, cement, and one or more solid filler. The epoxy silane may comprise one or more epoxy functional groups and one or more hydrolysable functional groups selected from siloxy, silane, and, silanol or combinations thereof. Also provided are kits comprising the components of the cementitious coating compositions, methods for providing coatings, layers or membranes derived from such wet compositions, as well as the coatings, layers or membranes derived therefrom.

17 Claims, 2 Drawing Sheets

HIGHLY WATER-RESISTANT, FLEXIBLE CEMENTITIOUS COATING

CROSS REFERENCE TO RELATED APPLICATIONS

This application claims the benefit of priority of U.S. Provisional Patent Application No. 62/786,064, filed Dec. 28, 2018, the disclosure of which is incorporated herein by reference in its entirety for all purposes.

FIELD OF THE INVENTION

Described herein are highly water-resistant, flexible cementitious coating compositions and methods of making same. More particularly, the highly water-resistant, flexible cementitious coating compositions are designed as protective barrier coatings which are applied, as aqueous compositions, over concrete structures. Furthermore, methods of making and using these compositions are described herein. The compositions disclosed herein can be utilized, for example, in the more demanding applications for water resistance, such as protection of underground tunnels, underground concrete pipes and below grade (for example, underground) walls and ceilings.

BACKGROUND OF THE INVENTION

Below grade and underground concrete structures often require application of the wet coating composition in a sub-optimal ventilation environment, and, in some cases, confined spaces. Accordingly, application of solvent-borne coatings may be too hazardous to the health and safety of the workers, and regulations may require the use of waterborne compositions. Furthermore, although the cementitious coating compositions disclosed herein are suitable protective coatings for any cementitious and concrete structures (overland or underground), the coatings are specifically designed with regard to the more stringent requirements of subterranean structures, where continual contact with water is more commonly encountered. Such specialty coatings are often subject to requirements dictated by local and/or national authorities. For example, Chinese Standard GB/50108, discussed further herein, has been established to set a standard for cementitious coatings. These standards require both a minimum dry tensile strength and elongation percentage of standardized samples (standardized size dimensions and shape) of the cementitious coating, as well as a minimum percent retained tensile strength and percent retained elongation percentage as measured while the standardized samples of the cementitious coating are still damp after 7 days soaking in water. The requirements are demanding. Currently, there are no commercial waterborne cementitious coating compositions that meet, or come close to meeting, the requirements. Therefore, there is a need for highly water-resistant, flexible cementitious coating compositions capable of maintaining tensile strength and elongation percentage. Additionally there is a need for methods for preparing, and methods for using such compositions.

Cementitious coatings also present additional challenges due to the nature of the composition. Cementitious coatings must balance the brittle nature of cement with the properties of other components in the coating composition. One common issue is mudcracking, which is the formation of irregular cracks that resemble dried mud. These cracks often occur due to stresses induced by a gradient in the thickness of an applied coating. Stress differentials can cause deep cracks to form in the coating, which can compromise the performance of the coating. Mudcracking is often observed in areas where the surface is non-uniform or in corners, where material can collect (e.g., an inside corner) or can be thinned (e.g., an outside corner). Therefore, there is a need for cementitious coatings that minimize the formation of cracks.

The invention is directed to these, as well as other, important ends.

SUMMARY OF THE INVENTION

Disclosed are waterborne cementitious coating compositions comprising, consisting of, or consisting essentially of: an aqueous styrene-butadiene latex, one or more epoxy silane, cement, and one or more solid filler.

The one or more epoxy silane may comprise one or more epoxy functional groups and one or more hydrolysable siloxy, silane, or silanol functional groups.

Also disclosed is a method for forming a cementitious coating, layer or membrane comprising applying a composition comprising an aqueous styrene-butadiene latex, one or more epoxy silane, cement, and one or more solid filler to a substrate to form a wet cementitious coating layer; and allowing or facilitating the wet cementitious coating layer to dry and/or cure to form a dried and/or cured cementitious coating, layer or membrane.

Also disclosed are methods for preparing a cementitious coating composition comprising mixing an aqueous styrene-butadiene latex, one or more epoxy silane, cement, and one or more solid filler.

Also provided is a kit comprising an aqueous styrene-butadiene latex, one or more epoxy silane, cement, and one or more solid filler.

A water-resistant, flexible cementitious coating, layer or membrane comprising a styrene-butadiene copolymer or residue thereof, cement, one or more solid filler, and an epoxy silane or epoxy silane residue is also provided.

According to a first aspect of the invention, a waterborne, water-resistant, flexible cementitious coating composition is disclosed. The composition comprises: (a) a polymer component and (b) an inorganic component. The polymer component (a) comprises: i) an aqueous styrene-butadiene latex and ii) one or more epoxy silane. The inorganic component (b) comprises i) cement; and ii) one or more solid filler.

The aqueous styrene-butadiene latex may comprise a copolymer comprising polymerized units of styrene monomer in an amount of from 15 to 85% by weight of the copolymer based on the total dry weight of the copolymer and polymerized units of butadiene monomer in an amount of from 15 to 85% by weight of the copolymer based on the total dry weight of the copolymer. The Tg of the copolymer may be from −60° C. to +60° C.

The one or more epoxy silane may comprise at least one epoxy functional group and at least one hydrolysable functional group selected from the group consisting of siloxy, silane, silanol, and combinations thereof. The one or more epoxy silane may comprise at least two epoxy functional groups and at least two hydrolysable functional groups selected from the group consisting of siloxy, silane, silanol, and combinations thereof. The one or more epoxy silane may comprise at least three epoxy functional groups and at least three hydrolysable siloxy, silane, or silanol functional groups. The one or more epoxy silane may comprises a oligomeric epoxy silane. The one or more epoxy silane may be or may comprise the following structure:

where R' may be —(CH$_2$)$_x$—O—(CH$_2$)$_y$—; x and y may be independently selected from 0 to 5; R may be selected from a C1 to C6 alkyl group, and may be further selected from the group consisting of —CH$_3$, —CH$_2$—CH$_3$, —CH$_2$—CH$_2$—CH$_3$, —CH(CH$_3$)$_2$, —CH$_2$—CH$_2$—CH$_2$—CH$_3$, —C(CH$_3$)$_3$ and mixtures thereof; and n is from 0 to 8, limits inclusive.

The cement in the waterborne, water-resistant, flexible cementitious coating composition may be or may comprise Portland Cement. The cement may be or may comprise calcium aluminate cement.

In some embodiments, the waterborne, water-resistant, flexible cementitious coating composition may have a polymer component to cement ratio, based on solids, of from 5:1 to 1:7. The polymer component to cement ratio, based on solids, may be from 1:1 to 1:4. The filler in the waterborne, water-resistant, flexible cementitious coating composition may be or may comprise sand, TiO$_2$, ZnO, Barium sulfate, calcium carbonate, silica, fly ash, fumed silica, metakaolin, or a combination thereof. The composition may further comprise one or more buffer, or residue thereof. The waterborne, water-resistant, flexible cementitious coating composition may further comprise a superplasticizer. The superplasticizer may be selected from poly(melamine sulfonate), poly(naphthalene sulfonate), polycarboxylate, salts thereof and derivatives thereof, and combinations thereof.

A method for forming a flexible, water-resistant cementitious coating, layer or membrane is disclosed. The method may comprise the steps of first, applying an embodiment of the waterborne, water-resistant, flexible cementitious coating composition to a substrate to form a wet cementitious coating layer; and second, allowing or facilitating the wet cementitious coating layer to dry and/or to cure to form a dried and/or cured cementitious coating, layer or membrane. The substrate the composition is applied to may be selected from concrete, stone, bricks, tile, cementitious materials, metal, wood, fiberglass, and synthetic materials. Also disclosed is the cementitious coating, layer or membrane produced by this method.

According to a second aspect of the invention, a method for preparing a flexible, water-resistant cementitious coating composition is disclosed. The method comprises mixing an aqueous styrene-butadiene latex, one or more epoxy silane, cement, and one or more solid filler. The one or more epoxy silane comprises at least one epoxy functional group and at least one hydrolysable functional group selected from the group consisting of siloxy, silane, silanol, and combinations thereof.

The method for preparing the flexible, water-resistant cementitious coating composition may further comprise adjusting the pH of the styrene-butadiene latex to a pH of 5 to 9. According embodiments of the method, the pH of the styrene-butadiene latex may be adjusted before or after mixing the one or more epoxy silane with the styrene-butadiene latex. The pH of the styrene-butadiene latex may be adjusted to a pH of 6 to 8 before or after mixing the one or more epoxy silane with the styrene-butadiene latex. In an embodiment, the step of adjusting the pH of the styrene-butadiene latex may occur prior to combining the epoxy silane with the styrene-butadiene latex.

According to a third aspect of the invention, a kit comprising an aqueous styrene-butadiene latex; one or more epoxy silane; cement; and one or more solid filler is disclosed. The one or more epoxy silane comprises one or more one epoxy functional groups and one or more hydrolysable functional groups selected from the group consisting of siloxy, silane, silanol, and combinations thereof. The aqueous styrene-butadiene latex and the one or more epoxy silane may be contained in a first pack of the kit. The cement and one or more solid filler may be contained in a second pack of the kit. In some embodiments of the kit, the pH of the styrene-butadiene latex may range from 5 to 9. The pH of the styrene-butadiene latex may range from 6 to 8.

According to a fourth aspect of the invention, a flexible, water-resistant cementitious coating, layer or membrane is disclosed. The flexible, water-resistant cementitious coating, layer or membrane comprises a styrene-butadiene copolymer or residue thereof; cement; one or more solid filler; and an epoxy silane or epoxy silane residue.

In some embodiments, the flexible, water-resistant cementitious coating, layer or membrane may further comprise one or more buffer, or residue thereof. The buffer or residue thereof may comprise potassium monobasic phosphate, or residue thereof. The flexible, water-resistant cementitious coating, layer or membrane may further comprise a superplasticizer. The superplasticizer may be selected from poly(melamine sulfonate), poly(naphthalene sulfonate), polycarboxylate, salts thereof and derivatives thereof, and combinations of the foregoing.

According to further embodiments, the flexible, water-resistant cementitious coating, layer or membrane may have an initial tensile strength of at least 1.8 MP, as determined on a dried test specimen shaped according to Die C of ASTM D412-15A and prepared and measured as described in ASTM D2370-98 wherein the measurement is performed after 24 hours conditioning at 23° C.±2° C. and 50% relative humidity. The flexible, water-resistant cementitious coating, layer or membrane may have a retained water resistance tensile strength of at least 50% of the initial value, as determined on a damp test specimen shaped according to Die C of ASTM D412-15A and prepared and measured as described in the same ASTM D2370-98, except that the measurement is performed after 7 days soak in room temperature water followed by patting with a dry cloth to remove excess water and then measured within 10 minutes of patting with a dry cloth; and the tensile strength measurements are performed at 23° C. f 2° C. and 50% relative humidity.

The flexible, water-resistant cementitious coating, layer or membrane may have an initial elongation of at least 80%, as determined on a dried test specimen shaped according to Die C of ASTM D412-15A and prepared and measured as described in ASTM D2370-98 wherein the measurement is performed after 24 hours conditioning at 23° C.±2° C. and 50% relative humidity. The flexible, water-resistant cementitious coating, layer or membrane may have a retained water resistance elongation of at least 50% of the initial value, as determined on a damp test specimen shaped according to Die C of ASTM D412-15A and prepared and measured as described in the same ASTM D2370-98, except wherein the measurement is performed after 7 days soak in room temperature water followed by patting with a dry cloth to remove excess water and then measured within 10 minutes of patting with a dry cloth; and wherein the elongation measurements are performed at 23° C.±2° C. and 50% relative humidity. The flexible, water-resistant cementitious coating, layer or membrane after drying, the cementitious coating, layer or membrane, may not exhibit a crack greater than 2 mm at the narrowest dimension.

DETAILED DESCRIPTION OF THE INVENTION

The present invention can be understood more readily by reference to the following detailed description, examples, drawings, and claims, and their previous and following description. However, it is to be understood that this invention is not limited to the specific compositions, articles, devices, systems, and/or methods disclosed unless otherwise specified, and as such, of course, can vary. While aspects of the present invention can be described and claimed in a particular statutory class, such as the composition of matter statutory class, this is for convenience only and one of skill in the art will understand that each aspect of the present invention can be described and claimed in any statutory class.

The following description of the invention is also provided as an enabling teaching of the invention in its best, currently known aspect. To this end, those of ordinary skill in the relevant art will recognize and appreciate that changes and modifications may be made to the various aspects of the invention described herein, while still obtaining the beneficial results of the present invention. It will also be apparent that some of the benefits of the present invention may be obtained by selecting some of the features of the present invention without utilizing other features. Accordingly, those of ordinary skill in the relevant art will recognize that many modifications and adaptations to the present invention are possible and may even be desirable in certain circumstances, and are thus also a part of the present invention.

While the present invention is capable of being embodied in various forms, the description below of several embodiments is made with the understanding that the present disclosure is to be considered as an exemplification of the invention, and is not intended to limit the invention to the specific embodiments illustrated. Headings are provided for convenience only and are not to be construed to limit the invention in any manner. Embodiments illustrated under any heading or in any portion of the disclosure may be combined with embodiments illustrated under the same or any other heading or other portion of the disclosure.

Any combination of the elements described herein in all possible variations thereof is encompassed by the invention unless otherwise indicated herein or otherwise clearly contradicted by context.

Unless otherwise expressly stated, it is in no way intended that any method or aspect set forth herein be construed as requiring that its steps be performed in a specific order. Accordingly, where a method claim does not specifically state in the claims or description that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of embodiments described in the specification. It is to be understood that both the foregoing general description and the following detailed description are exemplary and explanatory only and are not restrictive.

All publications mentioned herein are incorporated herein by reference to disclose and describe the methods and/or materials in connection with which the publications are cited.

It is to be understood that the terminology used herein is for the purpose of describing particular aspects only and is not intended to be limiting. Unless defined otherwise, all technical and scientific terms used herein have the same meaning as commonly understood by one of ordinary skill in the art to which this invention belongs. In this specification and in the claims which follow, reference will be made to a number of terms which are defined herein.

As used in the specification and the appended claims, the singular forms "a," "an" and "the" include plural referents unless the context clearly dictates otherwise.

As used in the specification and the appended claims, "a first pack" and "a second pack" (with respect to a two-pack composition) has no bearing on order of addition of the packs or components in the packs; it simply has the meaning of "a pack" and "another pack" and is used for ease of reference. A two-pack composition, for example, may comprise a kit in which two packs containing components of the composition are provided, such as a first pack containing polymer components (e.g., an styrene-butadiene latex and one or more epoxy silane) and a second pack containing inorganic components (e.g., cement and one or more solid filler).

As used herein, the term "siloxy functional group" refers to $—SiX_2(OR)$, $—SiX(OR)_2$, or $—Si(OR)_3$, where each R is an alkyl group and X can be any other group, including, but not limited to, an alkyl group, a halogen, or hydrogen. The R alkyl groups can be the same or different, even in the same siloxy functional group. Likewise, the X group can be the same or different, even in the same siloxy functional group.

As used herein, the term "silanol functional group" refers to $—SiX_2(OH)$, $—SiX(OH)_2$, or $—Si(OH)_3—$, where X can be any group, including, but not limited to, an alkyl group, a halogen, or hydrogen. The X group can be the same or different, even in the same silanol functional group.

As used herein, the term "single functionality epoxy silane" (or the use of the term "single functionality" referring to an epoxy silane) refers to an epoxy silane molecule containing only one epoxy functional group and only one siloxy, silane, or silanol functional group.

As used herein, the term "multifunctional epoxy silane" (or the use of the term "multifunctional" referring to an epoxy silane) refers to an epoxy silane molecule containing more than one epoxy functional group and more than one siloxy- or silanol-functional group. The number of epoxy functional groups and the number of siloxy- or silanol-functional groups may or may not be the same. Unless the word "polymer" is used, it does not refer to a polymer, and does not refer to an epoxy silane polymer.

As used herein, the terms "mudcracking" or "cracking" refer to cracks that appear during the formation of a cementitious coating. These cracks can be observed by the human eye, unassisted by optics, such as a microscope.

As used herein the term, "polymer component" or "liquid polymer emulsion" or "liquid polymer latex" or "liquid component", or "liquid" refers to component comprising the polymer latex including the water and the polymer particles dispersed therein and any other components that are dissolved or dispersed or otherwise mixed with the polymer latex.

As used herein, the terms "optional" or "optionally" mean that the subsequently described event, condition, component, or circumstance may or may not occur, and that the description includes instances where said event, condition, component, or circumstance occurs and instances where it does not.

As used herein, the phrase "sufficient to" (e.g., "conditions sufficient to") refers to such a value or a condition that is capable of performing the function or property for which a sufficient value or condition is expressed. As will be pointed out below, the exact value or particular condition required may vary from one embodiment to another, depending on recognized variables, such as the materials employed and/or the processing conditions.

The term "by weight," when used in conjunction with a component, unless specifically stated to the contrary, is based on the total weight of the formulation or composition in which the component is included. For example, if a particular element or component in a composition or article is said to have 8% by weight, it is understood that this percentage is in relation to a total compositional percentage of 100%. In some instances, the weight percent of a component is based on the total weight of the composition "on a dry basis," or "based on the total dry weight," which indicates the weight of the composition without water (e.g., less than about 1%, less than about 0.5%, less than about 0.1%, less than about 0.05%, or about 0% of water by weight, based on the total weight of the composition).

The use of numerical values in the various quantitative values specified in this application, unless expressly indicated otherwise, are stated as approximations as though the minimum and maximum values within the stated ranges were both preceded by the word "about." In this manner, slight variations from a stated value may be used to achieve substantially the same results as the stated value. Also, the disclosure of ranges is intended as a continuous range including every value between the minimum and maximum values recited as well as any ranges that may be formed by such values. Also disclosed herein are any and all ratios (and ranges of any such ratios) that may be formed by dividing a recited numeric value into any other recited numeric value. Accordingly, the skilled person will appreciate that many such ratios, ranges, and ranges of ratios may be unambiguously derived from the numerical values presented herein and in all instances such ratios, ranges, and ranges of ratios represent various embodiments of the present invention.

When disclosing numerical values herein, for example, 1, 2, 3, 4, 5, 6, 7, 8, 9, 10, the following sentence typically follows such numerical values: "Each of the foregoing numbers can be preceded by the term 'about,' 'at least about,' or 'less than about,' and any of the foregoing numbers can be used singly to describe an open-ended range or in combination to describe a close-ended range." This sentence means that each of the aforementioned numbers can be used alone (e.g., 4), can be prefaced with the word "about" (e.g., about 8), prefaced with the phrase "at least about" (e.g., at least about 2), prefaced with the phrase "less than about" (e.g., less than about 7), or used in any combination with or without any of the prefatory words or phrases to define a range (e.g., 2 to 9, about 1 to 4, 8 to about 9, about 1 to about 10, and so on). Moreover, when a range is described as "about X or less," this phrase is the same as a range that is a combination of "about X" and "less than about X" in the alternative. For example, "about 10 or less" is the same as "about 10, or less than about 10." Such interchangeable range descriptions are contemplated herein. Other range formats are disclosed herein, but the difference in formats should not be construed to imply that there is a difference in substance.

As used herein, the term "residue" of a chemical species, as used in the specification and concluding claims, refers to the moiety that is the resulting product of the chemical species in a particular reaction scheme or subsequent formulation or chemical product, regardless of whether the moiety is actually obtained from the chemical species. Thus, an ethylene glycol residue in a polyether refers to one or more —$OCH_2CH_2O$— units in the polyether, regardless of whether ethylene glycol was used to prepare the polyether. Furthermore, an epoxy-silane residue refers to a moiety that is the resulting product or remaining fragment of the epoxy-silane after reaction has occurred regardless of whether that moiety is a separate molecule or is now bonded to another molecule, or fragment thereof, or polymer, or fragment thereof.

As used herein, "fine particle size filler" refers to a filler having a particle size of no more than 50 microns.

As used herein, the term "substantially free of" refers to a composition having less than about 1% by weight, e.g., less than about 0.5% by weight, less than about 0.1% by weight, less than about 0.05% by weight, or less than about 0.01% by weight of the stated material, based on the total weight of the composition.

As used herein, the term "substantially," when used in reference to a composition, refers to at least about 60% by weight, e.g., at least about 65%, at least about 70%, at least about 75%, at least about 80%, at least about 85%, at least about 90%, at least about 91%, at least about 92%, at least about 93%, at least about 94%, at least about 95%, at least about 96%, at least about 97%, at least about 98%, at least about 99%, or about 100% by weight, based on the total weight of the composition, of a specified feature or component.

The glass transition temperature, Tg for the copolymers of the invention may be measured by differential scanning calorimetry (DSC), taking the mid-point in the heat flow versus temperature transition as the Tg value.

As used herein, "styrene-butadiene copolymer" refers to a copolymer comprising polymerized units of both styrene and butadiene monomers. The copolymer may further comprise polymerized units of one or more other monomers, as long as such other monomers, separately or in combination, do not make up more than 50% by weight of the total copolymer based on the total dry weight of the copolymer.

As used herein, "styrene-butadiene latex" refers to an aqueous dispersion of a styrene-butadiene copolymer, as defined herein above. Accordingly, the styrene-butadiene copolymer in the styrene-butadiene latex may additionally comprise polymerized units of one or more other monomers, as long as such other monomers, separately or in combination, do not make up more than 50% by weight of the total styrene-butadiene copolymer based on the total dry weight of the copolymer.

In some embodiments, the current invention relates to a waterborne cementitious coating composition comprising: an aqueous styrene-butadiene latex; one or more epoxy silane; cement; and one or more solid filler. The epoxy silane may comprise one or more epoxy functional groups and one or more hydrolysable siloxy, silane, or silanol functional groups. The hydrolysable siloxy, silane, or silanol functional groups may be the same or they may be different. In some embodiments, the epoxy silane may comprise two or more epoxy functional groups and two or more hydrolysable siloxy, silane, or silanol functional groups. The hydrolysable siloxy, silane, or silanol functional groups may be the same or they may be different.

Styrene-Butadiene Latex

In some embodiments, the waterborne cementitious coating composition comprises a styrene butadiene latex, as defined earlier herein. As discussed above, the styrene butadiene latex comprises a styrene butadiene copolymer comprising polymerized units of both styrene and butadiene monomers, and which may additionally comprise polymerized units of one or more other monomers, as long as such other monomers, separately or in combination, do not make up more than 50% by weight of the total styrene-butadiene copolymer weight based on the total dry weight of the copolymer. In an embodiment, monomers other than styrene and butadiene, separately or in combination, do not make up more than 40%, more than 30%, more than 20%, or more than 10% by weight of the total styrene-butadiene copolymer weight based on the total dry weight of the copolymer. For example, and without limitation, the additional monomers may be present for the purposes of aiding in stabilization of the copolymer in water, or for any other reason, and may include polymerized units of acid monomers such as without limitation acrylic acid, methacrylic acid, itaconic acid, 3-(acryloyloxy)propionic acid, or any other carboxylic acid containing monomers, all of which may be present in the latex (and/or in the cementitious coating composition) in an anionic form (for example, as carboxylates) or predominantly or partially anionic form. Similarly, and without limitation polymerized units of anionic monomers such as sulfate, sulfonate, phosphate, phosphonate, phenolate monomers, and the like, or monomers that can be converted to these anionic forms, may be suitable as additional monomers. Monomers comprising non-ionic groups which exhibit stearic effects and which contain long ethoxylate or hydrocarbon tails, or polymerizable surfactants, as known in the art, may also be present in the copolymer in polymerized form. Monomers that are present in the styrene-butadiene copolymer primarily to help confer stability in water are preferably used in an amount of from 0.1% to 10.0%, for example, from 0.2% to 5% or from 0.5% to 3.0% (percentage based on the weight of stabilizing monomer as a % of total dry weight of the styrene-butadiene copolymer including the stabilizing monomer). Carboxylate, sulfate, sulfonate, phosphate, phosphonate, phenolate monomers, and the like, or monomers that can be converted to these anionic forms, as well as polymerizable surfactants, may be suitable as additional monomers that may help confer stability of the copolymer in water. Any other additional monomer, in its polymerized form, may be present in the copolymer, many of which are commonly found in copolymers with styrene and butadiene monomers, such as, for example without limitation, acrylonitrile and/or acrylamide. For example, and without limitation, the additional monomers may be present for the purposes of reaction of the copolymer in dry films, or for any other reason, and may include polymerized units of functionalized monomers such as without limitation hydroxyethyl acrylate or methacrylate, acetoacetoxyethyl methacrylate, etc. Other monomers that can affect the molecular weight of the polymer such as crosslinkers (allyl methacrylate, ethylene glycol dimethacrylate, etc.) and chain transfer agent such as dodecyl mercaptan.

Some commercially available styrene-butadiene latexes comprise a copolymer comprising polymerized units of styrene, butadiene and a monomer that includes one or more carboxylic acid functionality. The latter monomer is typically present in an amount of about 0.5 to 3 wt. % (percentage based on total weight of the polymerized monomer units) and may be in an anionic form (carboxylate) and additionally include a counter ion, such as, for example, an ammonium ion ($NH_4^+$). Such latexes may have a pH of, for example, 9 to 10, although, for the purposes of the current invention, the actual pH of the latex is not particularly limited.

In some embodiments, the styrene-butadiene latex comprises a copolymer comprising polymerized units of styrene monomer in an amount of from 15 to 85% by weight of dried copolymer and polymerized units of butadiene monomer in an amount of from 15 to 85% based on the total dry weight of the copolymer.

In some embodiments, the copolymer comprises polymerized units of styrene in an amount of at least about 15% by weight, based on the total dry weight of the copolymer. In another embodiment, the copolymer comprises polymerized units of styrene in an amount no greater than about 85% by weight, based on the total dry weight of the copolymer. For example, the copolymer can comprise polymerized units of styrene in an amount (% by weight, based on the total dry weight of the copolymer) of 15, 20, 25, 30, 35, 40, 45, 50, 55, 60, 70, 80, or 85. Each of the foregoing numbers can be preceded by the word "about," "at least about," or "less than about," and any of the foregoing numbers can be used singly to describe an open-ended range or in combination to describe a closed-ended range. For example, and without limitation, the amount of polymerized units of styrene in the copolymer can be at least about 20% by weight, at least about 35% by weight, about 30% by weight to about 50% by weight, or less than about 60% by weight, based on the total dry weight of the copolymer.

In some embodiments, the copolymer comprises polymerized units of butadiene in an amount of at least about 15% by weight, based on the total dry weight of the copolymer. In another embodiment, the copolymer comprises polymerized units of butadiene in an amount no greater than about 85% by weight, based on the total dry weight of the copolymer dry. For example, the copolymer can comprise polymerized units of butadiene in an amount (% by weight, based on the total dry weight of the copolymer) of 15, 20, 30, 40, 45, 50, 55, 60, 65, 70, 75, 80, or 85. Each of the foregoing numbers can be preceded by the word "about," "at least about," or "less than about," and any of the foregoing numbers can be used singly to describe an open-ended range or in combination to describe a closed-ended range. For example, and without limitation, the amount of polymerized units of butadiene in the copolymer can be at least about 30% by weight, at least about 55% by weight, about 50% by weight to about 75% by weight, or less than about 80% by weight, based on the total dry weight of the copolymer.

With due consideration to the possible presence of one or more additional monomer types being present, in polymerized form, in the copolymer, the weight ratio of styrene:butadiene (monomers in polymerized form) may range from 15:85 to 85:15, from 20:80 to 80:20, from 30:70 to 70:30, or from 40:60 to 60:40. In some embodiments, the weight ratio of styrene:butadiene (monomers in polymerized form) may range from 15:85 to 70:30 or from 20:80 to 50:50.

In some embodiments, the Tg of the copolymer is from −60° C. to +60° C. In some embodiments, the Tg of the copolymer is at least −50° C., at least −40° C., or at least −30° C. In some embodiments, the Tg of the copolymer is no greater than +50° C., no greater than +40° C., or no greater than +30° C. For example, the Tg of the copolymer (° C.) can be −60, −50, −40, −30, −28, −26, −24, −22, −20, −18, −16, −14, −12, −10, −8, −6, −4, −2, 0, +2, +4, +6, +8, +10, +12, +14, 16, +18, +20, +22, +24, +26, +28, +30, +40, +50, +60. Each of the foregoing numbers can be preceded by the word "about," "at least about," or "less than about," and any of the foregoing numbers can be used singly to describe an open-ended range or in combination to describe a closed-ended range. For example, and without limitation, the Tg of the copolymer can be at least about −25° C., at least about 0° C., about −20° C. to about 0° C., less than about +10° C., less than about 0° C., or less than about −10° C.

The styrene-butadiene copolymer is usually provided to the formulation mixture as a styrene-butadiene latex, which is an aqueous colloidal suspension of the styrene-butadiene copolymer. Such latex dispersions are commercially available from suppliers such as Mallard Creek Polymers (Charlotte, N.C., USA), Synthomer (London, UK), Trinseo (Berwyn, Pa., USA), etc., and generally comprise water in an amount of from about 35% to about 75% by weight of the latex, and, in addition to the dispersed styrene-butadiene particles, the latex may include small quantities of one or more of an emulsifier, a surfactant, initiator or initiator residue fragments, polymerization catalysts, chain transfer agents, and the like.

The styrene-butadiene polymer latex may be prepared by any technique known in the art, such as emulsion polymerization, interfacial polymerization, or suspension polymerization. Emulsion polymerization techniques for preparing aqueous dispersions of latex polymer particles from ethylenically unsaturated monomers are well known in the art, and any conventional emulsion polymerization technique may be used, such as single and multiple shot batch processes, semi-continuous, and continuous processes. If desired, a monomer mixture can be prepared and added gradually to the polymerization vessel. The monomer composition may be varied during the course of the polymerization, such as by varying the composition of the monomer being fed into the vessel. Both single and multiple stage polymerization techniques may be used. The latex polymer particles can be prepared using a seed polymer emulsion to control the number of particles produced by the emulsion polymerization as is known in the art. The particle size of the latex polymer particles can be controlled by adjusting the initial surfactant charge as is known in the art. Aggregation of polymer particles is discouraged by including one or more micelle-forming, stabilizing surfactant in the polymerization mix, which surfactants may be anionic, non-ionic, or a mixture thereof, as known in the art. The preparation of polymer latexes is discussed generally in D. C. Blackley, *Emulsion Polymerization* (Wiley, N.Y., 1975).

Epoxy Silane

In certain embodiments, the cementitious coating composition of the present invention includes one or more epoxy silane. The epoxy silane may comprise one or more epoxy functional groups and one or more hydrolysable functional groups selected from siloxy, silane, silanol, and combinations thereof. In some embodiments, the epoxy silane comprises one or more epoxy functional groups and one or more hydrolysable functional groups selected from siloxy, silane, silanol, and combinations thereof. In some embodiments, the epoxy silane of the invention comprises at least three epoxy functional groups and at least three hydrolysable functional groups selected from siloxy, silane, silanol, and combinations thereof. In some embodiments, the epoxy silane comprises an oligomeric epoxy silane or an oligomeric cycloaliphatic epoxy silane.

According to some embodiments, the one or more epoxy silane comprises:

wherein R' is —$(CH_2)_x$—O—$(CH_2)_y$—, wherein x and y are independently from 0 to 5; each R is independently selected from a C1 to C6 alkyl group, and may be further selected from the group consisting of —$CH_3$, —$CH_2$—$CH_3$, —$CH_2$—$CH_2$—$CH_3$, —$CH(CH_3)_2$, —$CH_2$—$CH_2$—$CH_2$—$CH_3$, —$C(CH_3)_3$ and mixtures thereof; and n is from 0 to 8, such as, for example, from 2 to 6 or from 3 to 5.

The cementitious coating composition can comprise one or more epoxy silane, comprising one or more epoxy functional groups and one or more hydrolysable functional groups selected from siloxy, silane, silanol, and combinations thereof, in an amount (% by weight, based on the total weight of the wet cementitious coating composition after mixing of the polymer component and the inorganic component before drying) of 0.01, 0.02, 0.05, 0.1, 0.2, 0.25, 0.3, 0.4, 0.5, 0.6, 0.7, 0.8, 0.9, 1.0, 1.2, 1.4, 1.6, 1.8, 2.0, 2.5, 3.0 or 5.0. Each of the foregoing numbers can be preceded by the word "about," "at least about," or "less than about," and any of the foregoing numbers can be used singly to describe an open-ended range or in combination to describe a closed-ended range. For example, and without limitation, the amount of epoxy silane (% by weight, based on the total weight of the wet cementitious coating composition can be at least about 0.01% by weight, or at least about 0.02% by weight, or at least about 0.05% by weight, or at least about 0.1% by weight, or at least about 0.25% by weight, or about 0.2% by weight to about 2.0% by weight, or about 0.25% by weight to about 1.5% by weight, or less than about 2.5% by weight, based on the total weight of the wet cementitious coating composition after mixing of the polymer component and the inorganic component before drying.

Cement

The cementitious coating composition comprises both polymer and cement, and these coatings are therefore "polymer-modified concretes" (as opposed to "polymer concretes", in which the polymer replaces the cement). Furthermore, the cement is preferably a hydraulic cement, since non-hydraulic cements cannot be hardened (cured) when exposed to water. The most commonly used hydraulic cement is Portland cement, and these hydraulic cements have the ability to set and harden under water. Like Portland cement concrete, the primary curing mechanism for polymer-modified concrete is hydration of the cement binder. In certain embodiments, the cement in the cementitious coating composition is or comprises Portland cement.

Suitable hydraulic cements in the inventive compositions include all such chemical combinations of lime, silica, and alumina, or of lime and magnesia, silica, and alumina and iron oxide (for example, magnesia may replace part of the lime; and iron oxide may replace part of the alumina), as are commonly known as hydraulic natural cements. Hydraulic natural cements include grappier cements, pozzolan cements, natural cements, Portland cements, white cements and aluminous cements. Pozzolan cements include slag cements made from slaked lime and granulated blast furnace slag. In some embodiments, the cement is or comprises a calcium aluminate cement, also known as high alumina cement. In some embodiments, Portland cement is preferred for its superior strength among the natural cements. In addition to ordinary construction grades of Portland cement or other hydraulic natural cements, modified natural cements and Portland cements, such as high-early strength cement, heat-resistant cement, and slow-setting cement can be used in the present invention. Among Portland cements, any of the ASTM types I, II, III, IV, or V can be used. The term, "gray cement" as used herein refers to ordinary Portland cement. The term, "white cement" refers to white Portland cement. Portland cement can be any of the types defined in ASTM C 150, which details the types of Portland cements. Alternatively or in addition, the cements as described in ASTM C 1157 may also be used.

Polymer:Cement Ratios

In certain embodiments, the weight ratio, based on solids, of polymer (e.g., aqueous styrene-butadiene latex and one or more epoxy silane) to cement in the wet or dry composition is 1:10, 1:8, 1:7; 1:6, 1:5, 1:4, 1:3, 1:2, 1:1, 2:1, 3:1, 4:1, 5:1, 6:1, 7:1, 8:1, 10:1. Each of the foregoing numbers can be preceded by the word "about," "at least about," or "less than about," and any of the foregoing numbers can be used singly to describe an open-ended range or in combination to describe a close-ended range. For example, the cementitious coating composition can have a polymer to cement weight ratio, based on solids, of at least about 1:1, or from about 5:1 to about 1:5, or about 5:1 to 1:7, or about 1:1 to about 1:5, or about 1:1 to about 1:4, or about 1:2 to about 1:4.

The organic components in the composition may retard the cure of the hydraulic cement, but this effect may be offset by the addition of hydraulic cement cure accelerators, as are known in the art, such as calcium nitrate, calcium nitrite, calcium chloride, sodium carbonate or sodium hydroxide. Suitable amounts of sodium ion-containing accelerator may be, for example, from 0.25 to 5.0 weight percent on cement solids, or 0.5 to 2.0 weight percent on cement solids. The order of addition is not particularly limited; for example, for a 2-pack system the cement cure accelerator(s) may be included in either or both packs.

Fillers

In some embodiments, the cementitious coating composition comprises one or more fillers, which may take the form of an aggregate material or a fine particle size filler. The aggregate material may include sand, although any particulate material (crushed/fragmented or otherwise) may be used including sand, stone, gravel, pebbles, granite, marble chips, mica, ground glass, ground slag, diatomaceous earth, trap rock, fly ash, $TiO_2$, ZnO, Barium sulfate, emery powder, and the like, as well as coarser grades of calcium carbonate, silica, Wollastonite (calcium silicate, $CaSiO_3$), natural or synthetic fibers, and talc. In general, the nature of the aggregate (for example, choice of material(s), average particle sizes, and shapes, etc.) is dependent on the intended use of the cured cementitious composition, and mixtures of such fillers (weight average particle size of greater than 50 microns) can be used to fine-tune properties (e.g. rheological properties) and costs. In addition to the coarser aggregate material, the cementitious coating composition may comprise one or more fine particle size filler (weight average particle size of no more than 50 microns). Such fine particle size fillers are not particularly limited in type, and may include, for example, fine grades of silica and fumed silica, Wollastonite, calcium carbonate, barium sulfate, metakaolin, natural or synthetic fibers, etc. The fine particle size filler contributes to the compressive strength of the cured coating composition, with compressive strength and particle size inversely related in general. However, if too fine a particle size filler is employed, the resulting coating composition can become too thick and sticky for easy application.

In certain embodiments, the filler in the cementitious coating composition is or comprises sand, $TiO_2$, ZnO, Barium sulfate, calcium carbonate, silica, fly ash, fumed silica, metakaolin, or a combination thereof.

In some embodiments, the filler may be present in the cementitious coating composition in an amount ranging from about 0% to about 80% by weight based on the total weight of the inorganic component. For example, the filler may be present in an amount of at least 10%, at least 20%, at least 30%, at least 40%, or 50% by weight based on the total weight of the inorganic component. The filler may be present in an amount of less than 90%, less than 80%, less than 70%, less than 60%, less than 50%, or less than 40% by weight based on the total weight of the inorganic component.

In certain embodiments the ratio of the polymer component to the inorganic component can range from 1:0.5 to 1:1 to 1:2, such as 1:0.6, 1:0.8, 1:1.1, 1:1.2, 1:1.3, 1:1.4, 1:1.5, 1:1.6, 1:1.7, 1:1.8, 1:1.9. It is to be understood that the polymer component comprises the aqueous polymer latex and any additives therein and that the inorganic component comprises the cement and fillers and any additives therein.

Superplasticizer

The cementitious coating composition may comprise one or more superplasticizer. A superplasticizer, sometimes referred to as a water reducer, improves dispersion of the coating composition, so that less water is needed for good rheological properties, i.e. the ability to spread the coating in a thin, even layer prior to curing. In some embodiments, the cementitious coating composition comprises one or more superplasticizer selected from poly(melamine sulfonate), poly(naphthalene sulfonate), polycarboxylate, salts thereof and derivatives thereof, and combinations of the foregoing. Examples include poly(EO)-grafted polyacid species, oligo (EO)-grafted polyacid species (where EO refers to a polymerized unit or residue of ethylene oxide), sodium salts of poly(melamine sulfonate), poly(naphthalene sulfonate), and polycarboxylates and sodium naphthalene sulfonate formaldehyde.

The cementitious coating composition can comprise one or more superplasticizer in an amount (% by weight, based on the total weight of the wet cementitious coating composition) of 0.1, 0.2, 0.25, 0.3, 0.4, 0.5, 0.6, 0.7, 0.8, 0.9, 1.0, 1.2, 1.4, 1.6, 1.8, 2.0, 2.5 or 3.0. Each of the foregoing numbers can be preceded by the word "about," "at least about," or "less than about," and any of the foregoing numbers can be used singly to describe an open-ended range or in combination to describe a closed-ended range. For example, and without limitation, the amount of superplasticizer (% by weight, based on the total weight of the wet cementitious coating composition can be at least about 0.1% by weight, or at least about 0.25% by weight, or about 0.2% by weight to about 1.0% by weight, or about 0.25% by weight to about 0.5% by weight, or less than about 2.5% by weight, based on the total weight of the wet cementitious coating composition. Non-limiting examples of the superplasticizer that can be included in the composition include Sodium Naphthalene Sulfonate Formaldehyde UNF-5 from Muhu Construction chemicals (China), sulphonated melamine formaldehyde (SMF), sulphonated naphthalene formaldehyde (SNF), modified lignosulphonates (MLS) and polycarboxylate derivatives.

Dispersing Agent

In some embodiments, the composition described herein further comprises a dispersing agent. The dispersing agent may be used in addition to the superplasticizer. As used herein, the dispersing agent refers to any substance that when added to the sample suspension improves the separation of particles and assists in prevention of agglomeration or settling. The dispersing agent can include a non-surface active substance or a surface-active substance. Addition of dispersing agents may affect chemical and physical properties of the sample, for example, dispersing agents may deflocculate solids or reduce the viscosity of a final dispersion or paste. In some embodiments, addition of a dispersing agent may allow formation of final dispersions having higher amounts of dispersed powdered material. As one of ordinary skill in the art would readily appreciate, the dispersing additive may be useful to produce stable formulations and ensure longer shelf life and storage. Suitable dispersing agents include paraben derivatives, polyacid polymers such as poly(acrylic acid) or poly(methacrylic acid) or copolymers comprising polymerized units of acrylic acid or methacrylic acid, nonionic surfactants, or any combination thereof. Some commercial products marketed as wetting agents/aids may also function as dispersants. Dispersing agents typically can be used in an amount of about 0.1% to about 5.0%, preferably about 2.0% to about 4.0%, by weight of the total (wet) cementitious coating composition.

Buffer

In some embodiments, the cementitious coating composition may further comprise one or more buffer, or residue thereof. Any suitable buffer may be employed to adjust the pH of the cementitious coating composition (or component thereof), as described below. In some embodiments, potassium monobasic phosphate may be employed to adjust the pH of the cementitious coating composition. Accordingly, in some embodiments, the cementitious coating composition may further comprise potassium monobasic phosphate, or residue thereof, added in an amount suitable to adjust the pH of the cementitious coating composition (or component thereof) to a desired target pH, as discussed below.

Other Additives

If desired, other additives as known in the art can be included in the wet mix, such as thickeners including cellulosics, such as hydroxyl propyl cellulose, methyl cellulose, carboxymethylcellulose, sodium carboxymethylcellulose, rheology control agents, UV stabilizers, colorants, biocides, cosolvents, wetting agents, defoamers, additional water, etc.

In some embodiments, the cementitious coating composition further comprises a defoamer. The defoamer may be selected from, for example, silicone defoamers and other defoamers such as oil-based defoamers, ethylene oxide/propylene oxide defoamers, alkyl polyacrylate defoamers, as known or used in the art. The defoamer may optionally be provided on a carrier such as fumed silica so that it can be mixed into the powdered cement.

In certain embodiments, and as readily understood by one of ordinary skill in the art, the methods described herein may be performed in any suitable container known in the art that is capable of withstanding the method's conditions. Any suitable mixing apparatus may be used, and the manner in which the components are mixed is not particularly limited, for example the components may be mixed at room temperature and pressure. The duration of addition of the various components, and the duration of mixing at any stage during the process of formulating the wet composition, is not particularly limited, although, typically, the epoxy silane coupling agent may be metered in gradually over several minutes or more with stirring. The order of addition is also not particularly limited. Any suitable stirrer may be used, including, for example, ribbon blenders or rotary blenders such as an overhead pitched propeller blade attached to a mechanical disperser or stirrer.

In certain embodiments, the invention described herein relates to methods for providing a cementitious coating, layer or membrane.

Disclosed are methods for forming a cementitious coating, layer or membrane comprising, consisting of or consisting essentially of: applying a waterborne cementitious coating composition comprising an aqueous styrene-butadiene latex, one or more epoxy silane, cement, and one or more solid filler to a substrate to form a wet cementitious coating layer; and allowing or facilitating the wet cementitious coating layer to dry and/or cure to form a dried and/or cured cementitious coating, layer or membrane.

The substrate may be selected from, for example, concrete, stone, bricks, tile, cementitious materials, metal, wood, fiberglass, drywall and synthetic materials.

In some embodiments, the cementitious coating, layer or membrane can be applied for preservation of historic structures or items, such as buildings, architectural elements, statues, etc. The cementitious coating, layer or membrane may also be applied as a waterproofing coating, layer or membrane, such as, for example, a roofing material, pond liner, pool liner, water storage tank liner, dams, etc.

Another aspect of the present invention relates to a kit. In some embodiments, the kit may comprise an aqueous styrene-butadiene latex, one or more epoxy silane, cement, and one or more solid filler. The epoxy silane may comprise one or more epoxy functional group and one or more hydrolysable functional groups selected from siloxy, silane, silanol, and combinations thereof.

The kit may be provided such that the components are contained in individual packs, or certain components may be grouped together in a pack.

In some embodiments, the kit is provided as a 2-pack kit. For example, the 2-pack kit may include a first pack which may comprise the aqueous styrene-butadiene latex, optionally with other components, such as the other wet (liquid) components (this, is sometimes referred to as the wet pack or wet mix, or the liquid or the liquid component, even though it is understand that the latex comprises a waterborne dispersion of polymer particles.). A second pack may comprise the cement and one or more solid filler(s), optionally with other components, such as the other dry (solid) components (this is sometimes referred to as the dry pack or dry mix or the powder or the powder component or the inorganic component). However, it should be noted that it is not essential that only dry components are present in the dry pack, or that only wet components are present in the wet pack. The 2-pack kit is sometimes preferred because it allows a longer shelf life and the two packs can be pre-prepared, and (optionally) packaged and stored off-site before mixing at the site of application of the wet composition. In some embodiments, a two-pack kit, for example, may have a shelf life of 6 months or more, such as, for example, at least 12 months, at least 18 months, or at least 24 months. A 1-pack system is more appropriate in cases where all components can be mixed together at the site of application of the wet composition, and the substrate coated soon thereafter, preferably within 24 hours of mixing or sooner.

In other embodiments, the kit may be provided with more than two packs. For example, a third pack may comprise additives specific to the needs of a particular application.

Another aspect of the present invention relates to methods for preparing a cementitious coating composition. In some embodiments, a method for preparing a cementitious coating composition comprises mixing an aqueous styrene-butadiene latex, one or more epoxy silane, cement, and one or more solid filler. In certain embodiments, the cementitious coating composition is prepared from a kit containing one or more packs comprising the components.

In some embodiments, regardless of whether the method involves a 1-pack or a 2-pack composition or a kit, the method further comprises the step of adjusting the pH of the styrene-butadiene latex to a pH of 5 to 9 before or after combining the epoxy silane with the styrene-butadiene latex. In some embodiments, the pH of the styrene-butadiene latex is adjusted to a pH of 6 to 8 before or after combining the epoxy silane with the styrene-butadiene latex. In some embodiments, the step of adjusting the pH of the styrene-butadiene latex, either to a pH of 5 to 9 or pH of 6 to 8, occurs prior to combining the epoxy silane with the styrene-butadiene latex.

In certain embodiments, either before or after combining the epoxy silane with the styrene-butadiene latex, the pH of the styrene-butadiene latex is adjusted to a pH of 5, 5.2, 5.4, 5.6, 5.8, 6, 6.2, 6.4, 6.6, 6.8, 7, 7.2, 7.4, 7.6, 7.8, 8, 8.2, 8.4, 8.6, 8.8, or 9. Each of the foregoing numbers can be preceded by the word "about," "at least about," or "less than about," and any of the foregoing numbers can be used singly to describe an open-ended range or in combination to describe a close-ended range. For example, in some embodiments, the pH can be at least about 5.2, about 6.0 to about 8.0, or about 6.4 to about 7.6, or less than about 7.0. Test methods as are known in the art may be used for pH determinations.

In certain embodiments, the step of adjusting the pH of the styrene-butadiene latex is performed by addition of potassium monobasic phosphate.

The pH of the mixture generally rises upon addition of cement, typically to a pH of 10-12, although the actual pH at this stage is not particularly limited. Optionally, the pH of the final composition may be adjusted down toward (or even lower than) pH of 7, but, alternatively, the composition can also be used without adjusting the pH. The value of the final pH is not particularly limited.

Also disclosed herein is a water-resistant cementitious coating, layer or membrane produced by any of the methods disclosed herein. For example, also disclosed herein is a water-resistant, flexible cementitious coating, layer or membrane comprising: a styrene-butadiene copolymer or residue thereof; cement; one or more solid filler; and one or more epoxy silane or epoxy silane residue; wherein the epoxy silane or epoxy silane residue comprises one or more epoxy functional groups, one or more of which may be present as a reacted epoxy functional group, and one or more hydrolysable functional groups selected from siloxy, silane, silanol, and combinations thereof. One or more of these hydrolysable functional groups may be present as a reacted siloxy, silane, or silanol functional group.

In certain embodiments, the epoxy silane or epoxy silane residue comprises two or more epoxy functional groups, one or more of which may be present as a reacted epoxy functional group, and two or more hydrolysable functional groups selected from siloxy, silane, silanol, and combinations thereof. One or more of these hydrolysable functional groups may be present as a reacted siloxy, silane, or silanol functional group. In other embodiments, the epoxy silane or epoxy silane residue comprises at least three epoxy functional groups, one or more of which may be present as a reacted epoxy functional group, and at least three hydrolysable functional groups selected from siloxy, silane, silanol, and combinations thereof. One or more of these hydrolysable functional groups may be present as a reacted siloxy, silane, or silanol functional group.

In certain embodiments, the water-resistant, flexible cementitious coating, layer or membrane further comprises one or more buffer, or residue thereof. In certain embodiments, the buffer, or residue thereof, comprises potassium monobasic phosphate, or residue thereof.

In certain embodiments, the water-resistant, flexible cementitious coating, layer or membrane further comprises a superplasticizer. In certain embodiments, the superplasticizer is selected from poly(melamine sulfonate), poly(naphthalene sulfonate), polycarboxylate, salts thereof and derivatives thereof, and combinations of the foregoing.

In certain embodiments, the water-resistant, flexible cementitious coating, layer or membrane is capable of retaining tensile strength and/or elongation properties after exposure to water. Using the test methods described below on test specimens that have been conditioned for at least 24 hours at 23+/−2° C. and 50% relative humidity, the cementitious coating, layer or membrane may have a water resistance tensile retention rate of at least 40%, at least 45%, at least 50%, at least 60%, at least 70%, or at least 80% after subjecting the test specimens to 7 days soaking in water.

In some embodiments, the water-resistant, flexible cementitious coating, layer or membrane may have a water resistance elongation retention rate of at least 40%, at least 45%, at least 50%, at least 60%, at least 70%, or at least 80% after subjecting the test specimens to 7 days soaking in water.

In some embodiments, the water-resistant, flexible cementitious coating, layer or membrane may have a water resistance tensile retention rate and a water resistance elongation retention rate of at least 40%, at least 45%, at least 50%, at least 60%, at least 70%, or at least 80% after subjecting the test specimens to 7 days soaking in water.

Figure 1:
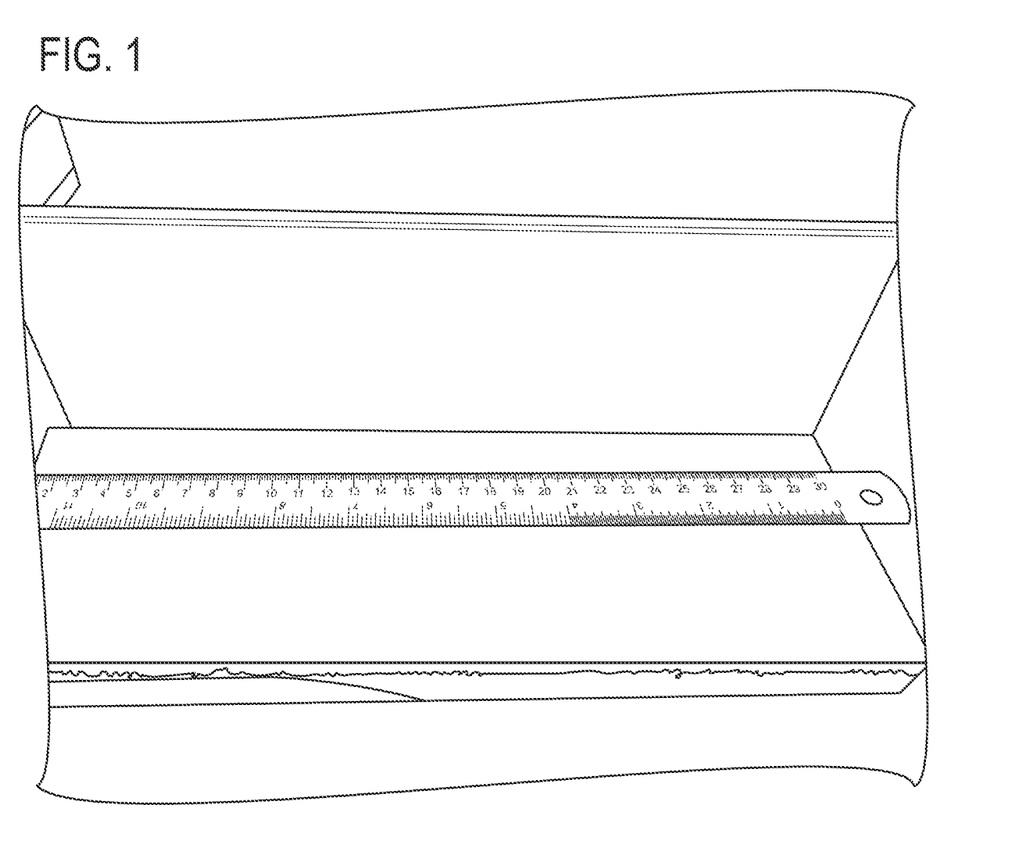
FIG. 1 shows a dried, cementitious coating according to an embodiment of the present invention.
Figure 2:
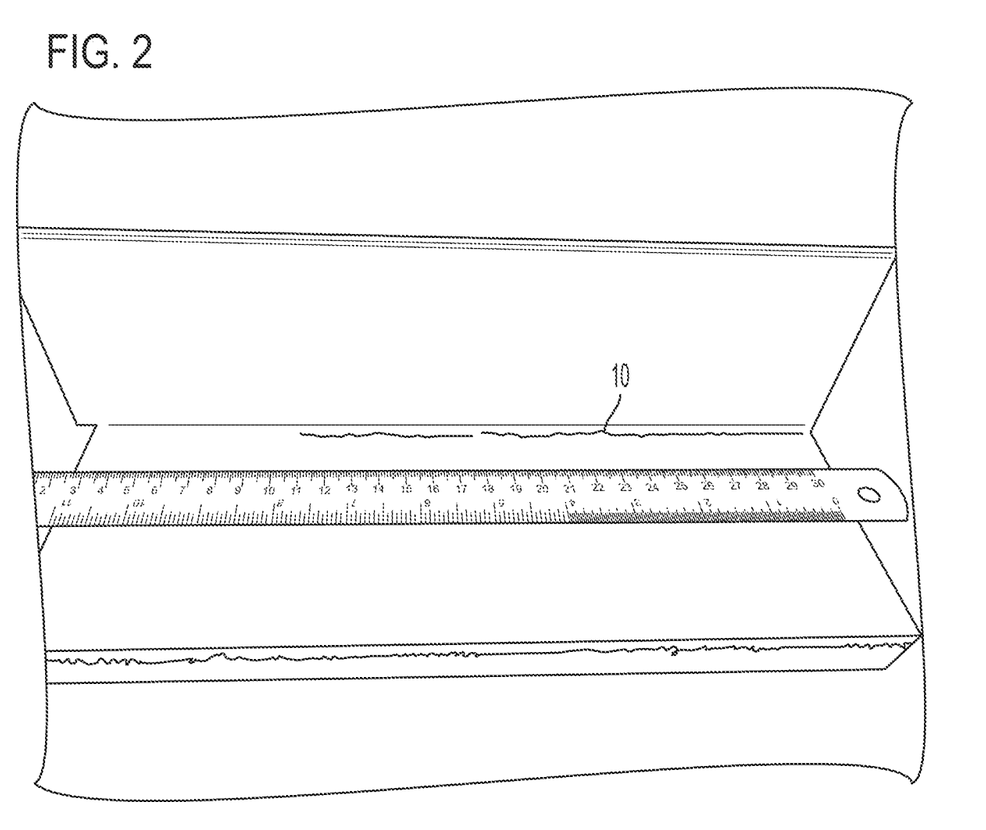
FIG. 2 shows mudcracking in commercially-available cementitious coating.

In certain embodiments the water-resistant, flexible cementitious coating, layer or membrane may resist mudcracking when the cementitious coating, layer or membrane is formed. A line drawing of a photograph of a sample according to an embodiment of the present invention is shown in FIG. 1. For comparison, a line drawing of a photograph of a commercially available cementitious coating is shown in FIG. 2. As seen in FIG. 1, there is little or no evidence of cracking in the sample according to an embodiment of the present invention. However, in the comparative example shown in FIG. 2, there is significant cracking 10 of the coating. After drying, the cementitious coating, layer or membrane may not exhibit cracks visible to the human eye, unassisted by optics, such as a microscope. In some embodiments, a dried cementitious coating, layer or membrane does not exhibit cracks greater than 2 mm at the narrowest dimension, e.g., the width of the crack does not exceed 2 mm. In some embodiments, the dried cementitious coating, layer or membrane does not exhibit cracks greater than 1 mm, greater than 0.5 mm, greater than 0.25 mm, or greater than 0.1 mm. As used herein, the term "dried cementitious coating, layer or membrane" refers to a cementitious coating, layer or membrane that has dried for at least 24 hours at a temperature of 23° C.±2° C. and 50% relative humidity.

In some embodiments, the water-resistant, flexible cementitious coating, layer or membrane may have a water retention tensile retention rate and/or water resistance elongation retention rate of at least 40%, at least 45%, at least 50%, at least 60%, at least 70%, or at least 80% after subjecting the test specimens to 7 days soaking in water, and the dried cementitious coating, layer or membrane does not exhibit cracks greater than 2 mm, greater than 1 mm, greater than 0.5 mm, greater than 0.25 mm, or greater than 0.1 mm.

The compositions and resulting coatings, layers or membranes of the invention may be used in multiple fields and applications, for example, and without limitation, as a coating or sealant on such substrates as concrete, drywall, stone, bricks, tile, cementitious substrates, metal, wood, fiberglass, and synthetic materials, and especially applied to inner, outer or concealed areas of civil engineering construction, building materials, and many more. The compositions of the invention may be used as a bond coat or adhesive in adhering new cement concrete to existing concrete, such as a new concrete overlay for an existing concrete floor, as a grout to repair cracks in existing concrete structures; as a bonding agent to adhere fresh cement concrete to steel reinforcing rods or plates, as, for example, in pre-tensioned or post-tensioned structural elements; as an adhesive grout for bonding aggregates, panels, tiles or the like to walls to provide a decorative effect; as a liner for ponds, swimming pools, fountains, and water tanks; as a protective overlay for concrete structures such as dams, bridge decks, piers, utility pylons, buildings and sculptures, and the like subject to exterior exposure, as well as indoor concrete surfaces such as flooring. Certainly, the compositions could also be utilized as the concrete structure itself (as opposed to just the protective coating layer over a concrete structure or other substrate), however, the added cost of such a structure may, in some cases, be prohibitive.

Although the cementitious coating compositions disclosed herein are suitable protective coatings for any cementitious and concrete structures (overland or underground), the product is particularly advantageously used in applications requiring a high degree of water resistance or waterproofing, such as subterranean structures, where continual contact with water is more commonly encountered. The compositions disclosed herein can be utilized, for example, in the more demanding applications for water resistance, such as protection of underground tunnels, underground concrete pipes and below grade (for example, underground) walls and ceilings.

In general, the coating compositions can be applied over a wide range of thicknesses, depending on the requirements of the application.

Some embodiments disclosed herein are set forth in the following clauses, and any combination of these clauses (or portions thereof) may be made to define an embodiment.

Certain non-limiting aspects of the invention are summarized below.

Aspect 1: A waterborne, water-resistant, flexible cementitious coating composition comprising:
a) a polymer component comprising:
i) an aqueous styrene-butadiene latex; and
ii) one or more epoxy silane; and
b) an inorganic component comprising:
i) cement; and
ii) one or more solid filler.

Aspect 2: The composition of Aspect 1 wherein the aqueous styrene-butadiene latex comprises a copolymer comprising polymerized units of styrene monomer in an amount of from 15 to 85% by weight of the copolymer based on the total dry weight of the copolymer and polymerized units of butadiene monomer in an amount of from 15 to 85% by weight of the copolymer based on the total dry weight of the copolymer.

Aspect 3: The composition of Aspect 2, wherein the Tg of the copolymer is from −60° C. to +60° C.

Aspect 4: The composition of any of the preceding Aspects, wherein the one or more epoxy silane comprises at least one epoxy functional group and at least one hydrolysable functional group selected from siloxy, silane, silanol, and combinations thereof.

Aspect 5: The composition of Aspect 4, wherein the one or more epoxy silane comprises at least two epoxy functional groups and/or at least two hydrolysable functional groups selected from siloxy, silane, silanol, and combinations thereof.

Aspect 6: The composition of Aspect 5, wherein the one or more epoxy silane comprises at least three epoxy functional groups and/or at least three hydrolysable functional groups selected from siloxy, silane, silanol, and combinations thereof.

Aspect 7: The composition of any one of the preceding Aspects, wherein the epoxy silane comprises an oligomeric epoxy silane.

Aspect 8: The composition of Aspect 1 or Aspect 2, wherein the one or more epoxy silane is or comprises:

wherein R' is $-(CH_2)_x-O-(CH_2)_y-$, wherein x and y are independently from 0 to 5; R is selected from a C1 to C6 alkyl group, and may be further selected from the group consisting of $-CH_3$, $-CH_2-CH_3$, $-CH_2-CH_2-CH_3$, $-CH(CH_3)_2$, $-CH_2-CH_2-CH_2-CH_3$, $-C(CH_3)_3$ and mixtures thereof; and n is from 0 to 8, limits inclusive.

Aspect 9: The composition of any one of the preceding Aspects, wherein the cement is or comprises Portland Cement.

Aspect 10: The composition of any one of Aspects 1 to 8, wherein the cement is or comprises calcium aluminate cement.

Aspect 11: The composition of any one of the preceding Aspects, wherein the composition has a polymer component to cement ratio, based on solids, of from 5:1 to 1:5.

Aspect 12: The composition of Aspect 10, wherein the composition has a polymer component to cement ratio, based on solids, of from 1:1 to 1:4.

Aspect 13: The composition of any one of the preceding Aspects, wherein the filler is or comprises TiO$_2$, ZnO, Barium sulfate, calcium carbonate, sand, silica, fly ash, fumed silica, metakaolin, or a combination thereof.

Aspect 14: The composition of any one of the preceding Aspects, further comprising one or more buffer, or residue thereof.

Aspect 15: The composition of any one of the preceding Aspects, further comprising a superplasticizer.

Aspect 16: The composition of Aspect 15, wherein the superplasticizer is selected from poly(melamine sulfonate), poly(naphthalene sulfonate), polycarboxylate, salts thereof and derivatives thereof, and combinations of the foregoing.

Aspect 17: A method for forming a flexible, water-resistant cementitious coating, layer or membrane comprising:
applying the composition of any one of Aspects 1 to 16 to a substrate to form a wet cementitious coating layer; and
allowing or facilitating the wet cementitious coating layer to dry and/or cure to form a dried and/or cured cementitious coating, layer or membrane.

Aspect 18: The method of Aspect 17, wherein the substrate is selected from concrete, stone, bricks, tile, drywall, cementitious materials, metal, wood, fiberglass, and synthetic materials.

Aspect 19: The cementitious coating, layer or membrane produced by the method of Aspect 07 or 18.

Aspect 20: A method for preparing a flexible, water-resistant cementitious coating composition comprising mixing an aqueous styrene-butadiene latex, one or more epoxy silane, cement, and one or more solid filler, wherein the one or more epoxy silane comprises at least one epoxy functional group and at least one hydrolysable functional group selected from siloxy, silane, silanol, and combinations thereof.

Aspect 21: The method of Aspect 20, further comprising adjusting the pH of the styrene-butadiene latex to a pH of 5 to 9 before or after mixing the one or more epoxy silane with the styrene-butadiene latex.

Aspect 22: The method of Aspect 21, wherein the pH of the styrene-butadiene latex is adjusted to a pH of 6 to 8 before or after mixing the one or more epoxy silane with the styrene-butadiene latex.

Aspect 23: The method of any one of Aspects 21 or 22, wherein the step of adjusting the pH of the styrene-butadiene latex occurs prior to combining the epoxy silane with the styrene-butadiene latex.

Aspect 24: A kit comprising:
an aqueous styrene-butadiene latex;
one or more epoxy silane;
cement; and
one or more solid filler;
wherein the one or more epoxy silane comprises one or more one epoxy functional group and one or more hydrolysable functional group selected from siloxy, silane, silanol, and combinations thereof.

Aspect 25: The kit of Aspect 24, wherein the aqueous styrene-butadiene latex and the one or more epoxy silane are contained in a first pack.

Aspect 26: The kit of Aspect 25, wherein the cement and one or more solid filler are contained in a second pack.

Aspect 27: The kit of any one of Aspects 24 to 26, wherein the pH of the styrene-butadiene latex ranges from 5 to 9.

Aspect 28: The kit of Aspect 27, wherein the pH of the styrene-butadiene latex ranges from 6 to 8.

Aspect 29: A flexible, water-resistant cementitious coating, layer or membrane comprising:
a styrene-butadiene copolymer or residue thereof;
cement;
one or more solid filler; and
an epoxy silane or epoxy silane residue.

Aspect 30: The flexible, water-resistant cementitious coating, layer or membrane of Aspect 29, further comprising one or more buffer, or residue thereof.

Aspect 31: The flexible, water-resistant cementitious coating, layer or membrane of Aspect 29, wherein the buffer or residue thereof comprises potassium monobasic phosphate, or residue thereof.

Aspect 32: The flexible, water-resistant cementitious coating, layer or membrane of any one of Aspects 29 to 31, further comprising a superplasticizer.

Aspect 33: The flexible, water-resistant cementitious coating, layer or membrane of Aspect 32, wherein the superplasticizer is selected from poly(melamine sulfonate), poly(naphthalene sulfonate), polycarboxylate, salts thereof and derivatives thereof, and combinations of the foregoing.

Aspect 34: The flexible, water-resistant cementitious coating, layer or membrane of any one of Aspects 29 to 33, having an initial tensile strength of at least 1.8 MP, as determined on a dried test specimen shaped according to Die C of ASTM D412-15A and prepared and measured as described in ASTM D2370-98 wherein the measurement is performed after 24 hours conditioning at 23° C.±2° C. and 50% relative humidity.

Aspect 35: The flexible, water-resistant cementitious coating, layer or membrane of Aspect 34, having a retained water resistance tensile strength of at least 50% of the initial value, as determined on a damp test specimen shaped according to Die C of ASTM D412-15A and prepared and measured as described in the same ASTM D2370-98, except wherein the measurement is performed after 7 days soak in room temperature water followed by patting with a dry cloth to remove excess water and then measured within 10 minutes of patting with a dry cloth; and wherein the tensile strength measurements are performed at 23° C.±2° C. and 50% relative humidity.

Aspect 36: The flexible, water-resistant cementitious coating, layer or membrane of any one of Aspects 29 to 35, having an initial elongation of at least 80%, as determined on a dried test specimen shaped according to Die C of ASTM D412-15A and prepared and measured as described in ASTM D2370-98 wherein the measurement is performed after 24 hours conditioning at 23° C.±2° C. and 50% relative humidity.

Aspect 37: The flexible, water-resistant cementitious coating, layer or membrane of Aspect 36, having a retained water resistance elongation of at least 50% of the initial value, as determined on a damp test specimen shaped according to Die C of ASTM D412-15A and prepared and measured as described in the same ASTM D2370-98, except wherein the measurement is performed after 7 days soak in room temperature water followed by patting with a dry cloth to remove excess water and then measured within 10 minutes of patting with a dry cloth; and wherein the elongation measurements are performed at 23° C.±2° C. and 50% relative humidity.

Aspect 38: The flexible, water-resistant cementitious coating, layer or membrane of any one of Aspects 29 to 37, wherein, after drying, the cementitious coating, layer or membrane, does not exhibit cracks greater than 2 mm at the narrowest dimension.

The present invention is further defined in the following Examples, in which all parts and percentages are by weight, unless otherwise stated. It should be understood that these examples, while indicating preferred embodiments of the invention, are given by way of illustration only and are not to be construed as limiting in any manner. From the above discussion and these examples, one skilled in the art can ascertain the essential characteristics of this invention, and without departing from the spirit and scope thereof, can make various changes and modifications of the invention to adapt it to various usages and conditions.

EXAMPLES

The determination of Elongation and Tensile Strength values for the various cementitious coating compositions described in the Examples section follows the method of ASTM D-2370-98 (Reapproved 2002) ("Standard Test Method for Tensile Properties of Organic Coatings", directed at free films of an organic coating), with the test specimen shape Die C described in ASTM D412-15A ("Standard Test Method for Vulcanized Rubber and Thermoplastic Elastomers", directed at vulcanized rubber and thermoplastic elastomers in the form of standard dumbbell-shaped specimens). The reported data feature the initial tensile strength (MPa)—the load per original unit area at which a specimen fails or yields in a tension (pull) test; and the initial elongation (%)—the increase in specimen length from the point of initial load application to the point of film rupture in a tension test. The initial testing is performed on test specimens that have been conditioned for at least 24 hours at 23+/−2° C. and 50% relative humidity and then tested in the same environment. In addition, each type of test is performed again on test specimens that have been subjected to 7 days soaking in water, followed by patting with a dry cloth to remove excess water, and then tested within 10 minutes of removal from water (before any drying or conditioning) while still damp. In the data presented below, the water resistance tensile retention rate and the water resistance elongation are reported as a % retention (e.g., if the initial specimen test score was 100 units and the test records a value of 80 units for the specimen tested after the 7 day soak, then the % retention is 80% retention).

The testing machine is of the constant-rate-of-crosshead-movement type, and comprises essentially (i) a fixed member (a fixed or essentially stationary member carrying one grip), (ii) a moveable member (a moveable member carrying a second grip), and (iii) grips (grips for holding the test specimen between the fixed member and the moveable member of the testing machine. The test specimen is inserted and clamped in the grips to ensure that the test specimen is aligned so that the long axis of the test specimen coincides with the direction of pull through the center line of the grip assembly. An extensometer with an initial gage length of 50 mm was used for all testing.

The test specimens were prepared in the ASTM standard D412-15A dumbbell shape specified in Die C, having a thickness of 0.25 to 3 mm and a length of 96 to 120 mm. The test specimens were prepared by first mixing together the desired components of the waterborne cementitious coating. The mixed composition was then applied in 2 layers to a nonstick polypropylene substrate using a doctor blade to achieve a dried thickness of 0.25 to 3 mm with a 24 hour cure between each layer. The final coating was allowed to cure for 7 days at 23° C. temperature and 50% relative humidity. Once cured, the coating layer was removed from the non-stick substrate, and subsequently allowed to further cure for 48 hours at 40° C. and 50% relative humidity. Next, the samples were cooled to 23° C.±1° C. for at least one hour. The samples were then cut into ASTM standard D412-15A, Die C, dumbbell shape test specimens. The test specimens were tested before and after conditioning as described below.

The test specimen is elongated in the testing machine until rupture of the test specimen occurs; the testing machine is computerized and determines the specimen elongation (by measuring the increase in length using the extensometer from the point of original load application to the point of rupture), and measures the tensile pull in kg required to rupture the specimen.

Elongation, $\% = (\Delta L/L) \times 100\%$ where:

$\Delta L$ = increase in specimen length to break, and $L$ = initial specimen length (gage length)

and Tensile Strength, $kg/m^2 = (P_r)/(TW)$ where:

$P_r$ = tensile pull to rupture, kg $T$ = thickness of test specimen, m $W$ = width of test specimen, m (Tensile Strength is reported in MPa. 1 MPa=101,972 $kg/m^2$)

Tensile properties may vary with specimen thickness, method of preparation, gage length, rate of load application, tensile tester response, and type of grips used. Accordingly, these factors are held constant across the data sets presented below in order to allow comparison of the data.

Unless stated otherwise, the aqueous styrene-butadiene emulsion used in all of the following Examples was Tylac 4193 (Mallard Creek, USA) which comprises 50.5-52.5 wt % solids, has Tg of −15° C., and is an aqueous emulsion.

In China, there are currently three levels of performance standards for waterborne cementitious coatings designed for water resistance in frequently wet conditions. No flexible cementitious coating product on the market meets the highest level of performance standard, GB/50108, the performance criteria for which are detailed in Table 1, below.

TABLE 1

Performance criteria for Chinese Standard GB/50108

|  | GB/50108 |
|---|---|
| Initial Tensile Strength (MPa) | ≥1.8 |
| Initial Elongation (%) | ≥80 |
| Water Resistance Tensile Strength Retention Rate (%) | ≥80 |
| Water Resistance Elongation Retention Rate (%) | ≥80 |

Retention of mechanical properties after long term soaking is necessary to perform well in frequently wet applications such as below grade water proofing and civil transportation tunnels. Retention of tensile strength after long term soaking is a more challenging target attribute than retention of elongation because, upon wetting, emulsion polymers and flexible cement films made therefrom tend to naturally reduce tensile strength and increase elongation through hydroplasticization.

Example 1

In this example, a variety of emulsion polymers were compared as follows. The polymers were minimally formulated (no crosslinker or coupling agent) into flexible cement membranes and tested for tensile strength and elongation initially and after a seven day water soak (Table 2, below). The standard formulation in Table 2 was a cementitious coating formulated with a 40:20:40 ratio (by weight including water) of liquid polymer emulsion:cement:filler (for example, 40 g liquid polymer emulsion; 20 g cement; 40 g filler thereby providing a 100 g sample, wherein the cement was Portland cement and the filler was silica) and with 3% defoamer (Foamaster® NXZ, BASF Corp., Ludwigshafen, Germany) and 3% wetting agent (Nuosperse® FN211, Elementis-Specialties, Inc., East Windsor, N.J., USA)

added. The emulsion polymers used were: Styrene-Butadiene (Tylac 4193) from Mallard Creek, 51.5 wt % polymer solids; Acrylic (Centurian) from Dow Chemical Co., 55 wt % polymer solids; Styrene-Acrylic (Acronal S400) from BASF company, 57 wt % polymer solids.

Results are shown in Table 2.

TABLE 2

Results of Example 1

| | Emulsion Polymer Type[1] | Tg (C) | Initial Tensile (MPa) | Initial Elongation (%) | % Retained Tensile After 7 Day Soak[2] | % Retained Elongation After 7 Day Soak[3] |
|---|---|---|---|---|---|---|
| 1A | Styrene-Butadiene | −15 | 1.0 | 95 | 98 | 85 |
| 1B | Acrylic | −35 | 0.9 | 310 | 26 | 115 |
| 1C | Styrene-Acrylic | −8 | 2.9 | 42 | 55 | 96 |
| 1D | Vinyl Acetate-Ethylene | 0 | 1.5 | 144 | 35 | 64 |

[1]The emulsion polymers were minimally formulated in an identical manner (same % polymer solids; same type and amount of defoamer, wetting agent, cement and filler).
[2]% Retained Tensile After 7 Day Soak = 100 * (Tensile After 7 Day Soak)/(Initial Tensile)
[3]% Retained Elongation After 7 Day Soak = 100 * (Elongation After 7 Day Soak)/(Initial Elongation)

The styrene-butadiene emulsion polymer clearly has the best results in terms of retained tensile strength and retained elongation after being soaked in water for 7 days.

Example 2

Comparison of various crosslinker chemistries and levels consisted of blending the additive with the styrene-butadiene emulsion polymer as described above prior to formulating into flexible cement coatings.

TABLE 3

Results of Example 2

| | Crosslinker in Formulation | Initial Tensile (MPa) | Initial Elongation (%) | % Retained Tensile After 7 Day Soak | % Retained Elongation After 7 Day Soak |
|---|---|---|---|---|---|
| 2A | None[1] | 1.0 | 95 | 98 | 85 |
| 2B | 0.5% Epoxy Silane[1,2] | 2.0 | 127 | 89 | 73 |
| 2C | 0.5% MF Epoxy Silane[1,3] | 2.2 | 81 | 109 | 102 |
| 2D | 1.0% MF Epoxy Silane[1,3] | 3.0 | 59 | 92 | 69 |

[1]Formulated in a ratio 40:20:40 (Liquid Polymer Emulsion:Cement:Filler).
[2]Epoxy silane (Silquest ® Wetlink-78, Momentive Performance Materials, Inc., Waterford, NY, USA).
[3]Multifunctional (MF) epoxy silane oligomer (CoatOSil ® MP-200, Momentive Performance Materials, Inc., Waterford, NY, USA).

The epoxy silane formulations were tested using a 40:20:40 weight ratio (Liquid Polymer Emulsion:Cement:Filler). All formulations in Table 3 used 3% defoamer (Foamaster® NXZ) and 3% wetting agent (Nuosperse® FN211), except formulation 2B used 4% defoamer (Foamaster® NXZ) and 3% wetting agent (TegoWet® 500, Evonik Industries, AG, Essen, Germany). The single functionality WL-78 epoxy silane provided a boost to the initial tensile strength, but was less effective at improving the % retained elongation after 7-day soak. The multifunctional (MF) epoxy silane provided a higher initial tensile strength (compared to the equivalent control with no coupling agent), and had better post-soak retained properties using the lower (0.5%) level of the coupling agent (compared to the 1.0% level). Formulation 2C, which utilized 0.5% of the multifunctional epoxy silane oligomer, had the best results.

Example 3

This Example further demonstrates the use and performance of the multifunctional epoxy silane coupling agent in waterborne cementitious coating formulations as well as that for the single functionality epoxy silane coupling agent. All formulations in Table 4 used 4% defoamer (Foamaster® NXZ) and 3% wetting agent (Nuosperse® FN211), except formulations 3A and 3F used 3% defoamer (Foamaster® NXZ) and 3% wetting agent (Nuosperse® FN211) and formulations 3B, 3C, 3G and 3H used 4% defoamer (Foamaster® NXZ) and 3% wetting agent (TegoWet® 500).

TABLE 4

Results of Example 3

| | Crosslinker in Formulation | Initial Tensile (MPa) | Initial Elongation (%) | % Retained Tensile After 7 Day Soak | % Retained Elongation After 7 Day Soak |
|---|---|---|---|---|---|
| 3A | None[1] | 1.0 | 95 | 98 | 85 |
| 3B | 0.5% Epoxy Silane[1,2] | 2.0 | 127 | 89 | 73 |

TABLE 4-continued

Results of Example 3

| | Crosslinker in Formulation | Initial Tensile (MPa) | Initial Elongation (%) | % Retained Tensile After 7 Day Soak | % Retained Elongation After 7 Day Soak |
|---|---|---|---|---|---|
| 3C | 0.5% Epoxy Silane[1,2,3] | 2.1 | 142 | 89 | 46 |
| 3D | 0.5% Epoxy Silane[1,2] | 1.9 | 110 | 77 | 63 |
| 3E | 0.5% Epoxy Silane[1,2,3] | 1.8 | 119 | 91 | 72 |
| 3F | 0.5% MF Epoxy Silane[1,4] | 2.2 | 81 | 109 | 102 |
| 3G | 0.5% MF Epoxy Silane[4,5] | 2.0 | 119 | 91 | 94 |
| 3H | 0.5% MF Epoxy Silane[4,6] | 2.6 | 125 | 92 | 95 |

[1]Formulated in a ratio 40:20:40 (Liquid Polymer Emulsion:Cement:Filler).
[2]Epoxy silane (Silquest ® Wetlink-78, Momentive Performance Materials, Inc., Waterford, NY, USA).
[3]Formulation additionally includes 0.3% surfactant (Triton ® X-405, Dow Chemical Co., Midland, MI, USA).
[4]Multifunctional (MF) epoxy silane (CoatOSil ® MP-200, Momentive Performance Materials, Inc., Waterford, NY, USA).
[5]Formulated in a ratio 40:16:32 (Liquid Polymer Emulsion:Cement:Filler, wherein 16 parts filler consisted of 14.4 parts cement and 1.6 parts high alumina cement; and 32 parts filler consisted of 28 parts silica and 4 parts fumed silica).
[6]Formulated in a ratio 40:16:32 (Liquid Polymer Emulsion:Cement:Filler, wherein 16 parts filler consisted of 14.4 parts cement and 1.6 parts high alumina cement; and 32 parts filler consisted of 28 parts silica and 4 parts metakaolin).

Comparing the waterborne cementitious coating formulation, it is apparent that the four formulations using the single functionality epoxy silane (3B, 3C, 3D and 3E) did not have as good results in terms of both initial and retained tensile properties as the multifunctional epoxy silane. On the other hand, all three of the formulations using the multifunctional epoxy silane (3F, 3G and 3H) were higher than the control formulation with no coupling agent, and all three had more than 80% retained elongation after a 7-day soak. This is surprising because the multifunctional epoxies are less reactive in general, and therefore it was not expected that the multifunctional epoxy silane would produce the best tensile properties compared to the more reactive single functionality epoxy silanes.

Example 4

In this Example, several commercially available water-resistant cementitious coating products were tested as described above. The results are presented in Table 5.

TABLE 5

Initial and wet-aged tensile properties of commercial products.

| | Commercial Product | Initial Tensile (MPa) | Initial Elongation (%) | % Retained Tensile After 7 Day Soak | % Retained Elongation After 7 Day Soak |
|---|---|---|---|---|---|
| 4A | JS 101 (Oriental Yuhong) | 2.01 | 118 | 40 | — |
| 4B | JS 101 (Oriental Yuhong) | 2.03 | 112 | 43 | 110 |
| 4C | JS-11 RX (Oriental Yuhong) | 1.63 | 169 | 71 | 64 |
| 4D | RX-200 (Oriental Yuhong) | 1.90 | 165 | 47 | — |
| 4E | SIKA Top Seal 108 (Sika) | 1.85 | 0 | 57 | — |

These results show clearly that the commercial products have reduced retention of tensile properties after soaking in water for 7 days and being tested wet, compared to the formulations comprising the styrene-butadiene polymer and the multifunctional epoxy silane.

Example 5

In this example, various amounts of multifunctional epoxy silane were compared, as well as the effect of varying the type of cement, the amount of the styrene-butadiene emulsion (also referred to as latex), the presence of a buffer and the ratio of the polymer component to the inorganic component. It is to be understood that the polymer component comprises the aqueous styrene-butadiene latex, the epoxy silane and the optional buffer. It should also be understood that the inorganic component comprises the cement and any fillers. The ratio is by weight, including the weight of the water in the aqueous component. The amount of epoxy silane is recited as the wt % present in the latex. The buffer used is sodium monobasic phosphate.

TABLE 6

Results of Example 5

| | Percent multifunctional epoxy-silane | Cement type | Buffer % of polymer component | Ratio of Polymer component to inorganic component | Initial Tensile (MPa) | Initial Elongation (%) | % Retained Tensile After 7 Day Soak | % Retained Elongation After 7 Day Soak |
|---|---|---|---|---|---|---|---|---|
| 5A | 0.00 | Gray | 0 | 1:1.5 | 1.44 | 232% | 74% | 54% |
| 5B | 0.50 | Gray | 0 | 1:1.5 | 1.72 | 105% | 108% | 91% |
| 5C | 0.90 | Gray | 0 | 1:1.5 | 2.10 | 99% | 89% | 65% |
| 5D | 1.125 | Gray | 0 | 1:1.5 | 2.13 | 83% | 97% | 89% |
| 5E | 0.00 | White | 0 | 1:1.5 | 1.42 | 209% | 78% | 59% |
| 5F | 0.45 | White | 0 | 1:1.5 | 1.73 | 148% | 101% | 54% |
| 5G | 0.50 | White | 0 | 1:1.5 | 1.83 | 103% | 114% | 74% |
| 5H | 0.60 | White | 0 | 1:1.5 | 1.95 | 108% | 100% | 78% |
| 5I | 0.75 | White | 0 | 1:1.5 | 2.10 | 149% | 104% | 43% |
| 5J | 0.90 | White | 0 | 1:1.5 | 2.29 | 111% | 97% | 45% |
| 5K | 0.30 | White | 0 | 1:1.6 | 1.82 | 107% | 100% | 73% |
| 5L | 0.40 | White | 0 | 1:1.6 | 1.90 | 111% | 103% | 63% |
| 5M | 0.50 | White | 0 | 1:1.6 | 2.05 | 105% | 102% | 66% |
| 5N | 0.30 | White | 0 | 1:1.7 | 1.77 | 90% | 104% | 71% |
| 5O | 0.40 | White | 0 | 1:1.7 | 2.00 | 85% | 103% | 56% |
| 5P | 0.50 | White | 0 | 1:1.7 | 2.22 | 70% | 98% | 69% |
| 5Q | 0.45 | White | 0.6 | 1:1.5 | 1.66 | 151% | 94% | 67% |
| 5R | 0.60 | White | 0.6 | 1:1.5 | 1.83 | 131% | 88% | 78% |
| 5S | 0.75 | White | 0.6 | 1:1.5 | 1.90 | 119% | 90% | 75% |
| 5T | 0.90 | White | 0.6 | 1:1.5 | 1.90 | 114% | 94% | 64% |

These results suggest that the minimum level of multifunctional epoxy silane needed to exceed the commercial controls and retain an adequate amount of tensile is 0.45% for cement at a polymer component ratio to inorganic component ratio of 1:1.5 and 0.3% at a liquid to powder ratio of 1:1.6 to 1:1.7.

Example 6

This Example evaluates the ratio of the polymer component to the inorganic compound at two levels of the multifunctional epoxy silane and three buffer levels. The results shown below in Table 7 that the performance of commercial controls can be exceeded and more than 80% tensile retention can be achieved when there is 0.5 wt % and 1.25 wt % of multifunctional epoxy silane as a percent of the polymer component. Also shown is that at least 80% of the tensile properties are retained at a polymer component to inorganic component ratio range of 1:1 to 1:1.7. The buffer used was sodium monobasic phosphate.

Example 7

Example 7 demonstrates the effect of amount of cement in the coating composition on the retained tensile properties after soaking the samples in water for 7 days. Generally, when the amount of cement as a percent of the inorganic component varies from 20 weight percent to 50 weight percent (the balance of the inorganic component comprising filler), minimal effect of retained tensile strength was observed. The details of the tested samples and the results are shown in Table 8. All of the samples shown in Table 8 were made with 0.3 wt % of buffer in the polymer component, as a percent of the polymer component.

TABLE 7

Results of Example 6

| | Percent multifunctional epoxy-silane | Cement type | Buffer % of polymer component | Ratio of Polymer component to inorganic component | Initial Tensile (MPa) | Initial Elongation (%) | % Retained Tensile After 7 Day Soak | % Retained Elongation After 7 Day Soak |
|---|---|---|---|---|---|---|---|---|
| 6A | 1.25 | Gray | 0.6 | 1:1 | 1.59 | 136% | 81% | 104% |
| 6B | 1.25 | Gray | 0.6 | 1:1.25 | 1.98 | 90% | 82% | 107% |
| 6C | 1.25 | Gray | 0.6 | 1:1.5 | 1.91 | 73% | 95% | 92% |
| 6D | 1.25 | Gray | 0.6 | 1:1.75 | 2.19 | 55% | 90% | 76% |
| 6E | 1.25 | Gray | 0.6 | 1:2 | 2.41 | 28% | 82% | 143% |
| 6F | 0.5 | White | 0.0 | 1:1.5 | 1.83 | 103% | 114% | 74% |
| 6G | 0.5 | White | 0.0 | 1:1.6 | 2.05 | 105% | 102% | 66% |
| 6H | 0.5 | White | 0.0 | 1:1.7 | 2.22 | 70% | 98% | 69% |
| 6I | 0.5 | White | 0.3 | 1:1.5 | 2.11 | 115% | 90% | 90% |
| 6J | 0.5 | White | 0.3 | 1:1.6 | 1.87 | 140% | 95% | 69% |
| 6K | 0.5 | White | 0.3 | 1:1.7 | 1.79 | 70% | 98% | 91% |

TABLE 8

Results of Example 7

| Percent multifunctional epoxy-silane | Cement type | Weight % of cement in inorganic component | Ratio of Polymer component to inorganic component | Initial Tensile (MPa) | Initial Elongation (%) | % Retained Tensile After 7 Day Soak | % Retained Elongation After 7 Day Soak |
|---|---|---|---|---|---|---|---|
| 7A | 0.5 | White | 20 | 1:1.5 | 1.67 | 153% | 102% | 86% |
| 7B | 0.5 | White | 30 | 1:1.5 | 1.82 | 152% | 98% | 72% |
| 7C | 0.5 | White | 40 | 1:1.5 | 1.90 | 126% | 100% | 71% |
| 7D | 0.5 | White | 50 | 1:1.5 | 1.83 | 111% | 102% | 69% |

Example 8

Example 8 is experiments conducted to determine if changing the amounts of other common additives had an effect on the retained tensile properties of the coating composition. The level of sodium monobasic phosphate as a buffer used from 0 to 0.6 wt % of the polymer component did not have a significant effect on the initial or retained tensile properties.

Similarly, the wetting agent NUOSPERSE® FN-211 (Elementis) used at 0.3 to 0.9 wt % of the polymer component did not affect the initial or retained tensile properties.

Various defoamers, used at the listed wt % as a percent weight of the polymer component did not affect the initial or retained tensile properties. Foamaster® 111 (0.4 to 1 wt %) (BASF); Nopco NXZ (0.4 wt %) (Henkel), TEGO® Foamex 1488 (0.37 wt %) and BYK®-093 (0.37 wt %) (Byk USA).

The thickeners listed below also do not affect the initial or retained tensile properties when used at the states levels as a percent of the polymer component. WALOCEL® MKW 20,000 PP20 (0.02 to 0.03 wt %) (Dow Chemical Co.); WALOCEL® MT 30,000 (0.03 wt %) (Dow Chemical Co.); GMC-1212 (0.02 to 0.07 wt %) (Shanghai Huiguang).

Finally, testing indicated that superplasticizers, zinc oxide and metakaolin did not significantly adversely affect the initial or retained tensile properties.

When ranges are used herein for physical properties, such as temperature ranges and pH ranges, or chemical properties, such as chemical formulae, all combinations, and sub-combinations of ranges and specific embodiments therein are intended to be included.

The disclosures of each patent, patent application, and publication cited or described in this document are hereby incorporated herein by reference, in their entirety.

While the preferred forms of the invention have been disclosed, it will be apparent to those skilled in the art that various changes and modifications may be made that will achieve some of the advantages of the invention without departing from the spirit and scope of the invention. It is, therefore, intended that the appended claims cover all such equivalent variations as fall within the true spirit and scope of the invention.

What is claimed:
1. A waterborne, water-resistant, flexible cementitious coating composition comprising:
   a) a polymer component comprising:
      i) an aqueous styrene-butadiene latex; and
      ii) one or more epoxy silane; and
   b) an inorganic component comprising:
      i) cement; and
      ii) one or more solid filler,
   wherein the one or more epoxy silane comprises at least two epoxy functional groups and at least two hydrolysable functional groups selected from the group consisting of siloxy, silane, silanol, and combinations thereof.

2. The composition of claim 1, wherein the aqueous styrene-butadiene latex comprises a copolymer comprising polymerized units of styrene monomer in an amount of from 15 to 85% by weight of the copolymer based on the total dry weight of the copolymer and polymerized units of butadiene monomer in an amount of from 15 to 85% by weight of the copolymer based on the total dry weight of the copolymer.

3. The composition of claim 1, wherein the one or more epoxy silane comprises an oligomeric epoxy silane.

4. The composition of claim 1, wherein the one or more epoxy silane comprises:

wherein R' is $(CH_2)_x$—O—$(CH_2)_y$—, wherein x and y are independently selected from 0 to 5; each R is independently selected from a C1 to C6 alkyl group; and n is from 0 to 8.

5. The composition of claim 1, wherein the cement comprises at least one of Portland Cement and calcium aluminate cement.

6. The composition of claim 1, wherein the composition has a polymer component to cement ratio, based on solids, of from 5:1 to 1:5.

7. The composition of claim 1, wherein the filler is selected from the group consisting of sand, calcium carbonate, silica, $TiO_2$, ZnO, Barium sulfate, fly ash, fumed silica, metakaolin, and combinations thereof.

8. The composition of claim 1, further comprising one or more buffer.

9. The composition of claim 1, further comprising a superplasticizer, wherein the superplasticizer is selected from the group consisting of poly(melamine sulfonate), poly(naphthalene sulfonate), polycarboxylate, salts thereof, derivatives thereof, and combinations thereof.

10. A method for forming a water-resistant, flexible cementitious coating, layer or membrane comprising:
   applying the composition of claim 1 to a substrate to form a wet cementitious coating layer; and
   allowing or facilitating the wet cementitious coating layer to form a dry cementitious coating, dry layer or dry membrane.

11. The method of claim 10, wherein the substrate is selected from the group consisting of concrete, stone, bricks, tile, drywall, cementitious materials, metal, wood, and synthetic materials.

12. A water-resistant, flexible cementitious coating, layer or membrane produced by the method of claim 10.

13. A kit comprising:
an aqueous styrene-butadiene latex;
one or more epoxy silane;
cement; and
one or more solid filler;
wherein the one or more epoxy silane comprises one or more one epoxy functional group and one or more hydrolysable functional groups selected from the group consisting of siloxy, silane, silanol, and combinations thereof; and
wherein the aqueous styrene-butadiene latex and the one or more epoxy silane are contained in a first pack and wherein the cement and one or more solid filler are contained in a second pack.

14. The kit of claim 13, wherein the pH of the styrene-butadiene latex ranges from 5 to 9.

15. A dry, water-resistant, flexible cementitious coating, layer or membrane comprising:
a styrene-butadiene copolymer;
hydrated cement;
one or more solid filler; and
one or more epoxy silane, or a residue of the one or more epoxy silane, wherein the one or more epoxy silane comprises at least two epoxy functional groups and at least two hydrolysable functional groups selected from the group consisting of siloxy, silane, silanol and combinations thereof.

16. The dry, water-resistant, flexible cementitious coating, layer or membrane of claim 15, further comprising one or more buffer.

17. The dry, water-resistant, flexible cementitious coating, layer or membrane of claim 15, further comprising a superplasticizer, wherein the superplasticizer is selected from the group consisting of poly(melamine sulfonate), poly(naphthalene sulfonate), polycarboxylate, salts thereof, derivatives thereof, and combinations thereof.

\* \* \* \* \*